Figure 1:
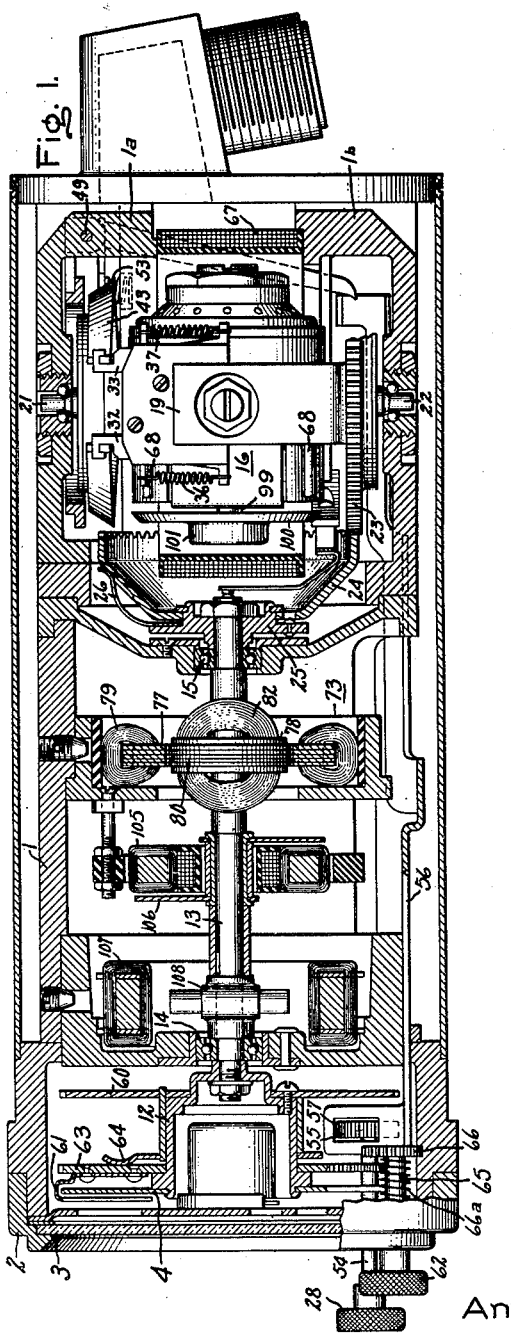

Inventors:
Allen T. Sinks, Deceased.
Anna C. Sinks, Administratrix.
Richard A. Pfuntner,
Samuel Gabrielson,
by Prowell J. Mack
Their Attorney.

March 25, 1952    A. T. SINKS ET AL    2,590,798
GYROSCOPIC DIRECTION INDICATOR

Original Filed Aug. 2, 1945    3 Sheets-Sheet 2

Inventors:
Allen T. Sinks, Deceased.
Anna C. Sinks, Administratrix.
Richard A. Pfuntner,
Samuel Gabrielson,
by *Prowell & Mack*
Their Attorney Patented Mar. 25, 1952

2,590,798

UNITED STATES PATENT OFFICE 2,590,798

GYROSCOPIC DIRECTION INDICATOR

Allen T. Sinks, deceased, late of Beach Bluff, Mass., by Anna C. Sinks, administratrix, Beach Bluff, Mass., and Richard A. Pfuntner, Saugus, and Samuel Gabrielson, South Lynnfield, Mass., assignors to General Electric Company, a corporation of New York Original application August 2, 1945, Serial No. 608,506. Divided and this application August 2, 1949, Serial No. 112,092

4 Claims. (Cl. 33—204)

The present invention relates to gyroscopic direction indicators for aircraft of the type in which the rotatable compass dial is actuated primarily by means of a directional gyro, and secondarily by means of a magnetic compass which acts slowly to correct the gyro upon a departure of the spin axis thereof from a predetermined relationship with the magnetic meridian as measured by the compass, and a general object of the present invention is to provide a new and improved device of this character.

This application is a division of our application Serial Number 608,506, filed August 2, 1945, entitled "Gyroscopic Direction Indicator," now Patent 2,585,693, and assigned to the assignee of the present application.

A magnetic compass when used as a direction indicator on aircraft is subject to the disadvantage that it is thrown off by accelerations, making reading difficult in rough air and practically impossible during turns. A directional gyro type of indicator has the advantage that it is not affected by acceleration but is subject to slow wander or drift due to rotation of the earth, gimbal friction, etc., and for that reason must be periodically corrected. To overcome these difficulties it has been proposed heretofore to "slave" the directional gyro to the magnetic meridian by the provision of means for comparing the positions of the gyro and the compass and correcting the gyro in response to any detected deviation of the gyro from the magnetic meridian reference. The gyro is usually corrected by the use of a torque motor for applying a precessing torque to the gyro about the horizontal gyro axis in a direction to cause precession of the gyro about the vertical gyro axis in the desired direction.

In order to utilize the stabilizing action of the directional gyro to the fullest advantage, the correction imposed thereon by the compass must be relatively slow, i. e. of the order of two or three degrees per minute, as otherwise the azimuth indicating dial would oscillate with the compass and no averaging or integrating action would take place. When the indicator is initially energized, the gyro is usually out of correspondence with the compass, and with previous devices it has been necessary to further complicate the apparatus by the provision of additional means for obtaining a high initial precession rate to initially bring the gyro into correspondence with the compass. Furthermore, there has been no way of ascertaining whether the gyro was in or out of correspondence with the compass.

Accordingly, it is an object of the present invention to provide means for visually indicating to the pilot or other operator when the gyro and compass are in correspondence whereby the initial setting of the gyro can be accomplished manually and whereby during subsequent operation warning will be given in case the gyro moves out of corresppondence with the compass due to failure of the gyro precessing control.

Other objects and advantages of our invention will become apparent as the following description proceeds.

For a more detailed description of the present invention, reference should now be made to the following description taken in connection with the accompanying drawings.

Figure 2:
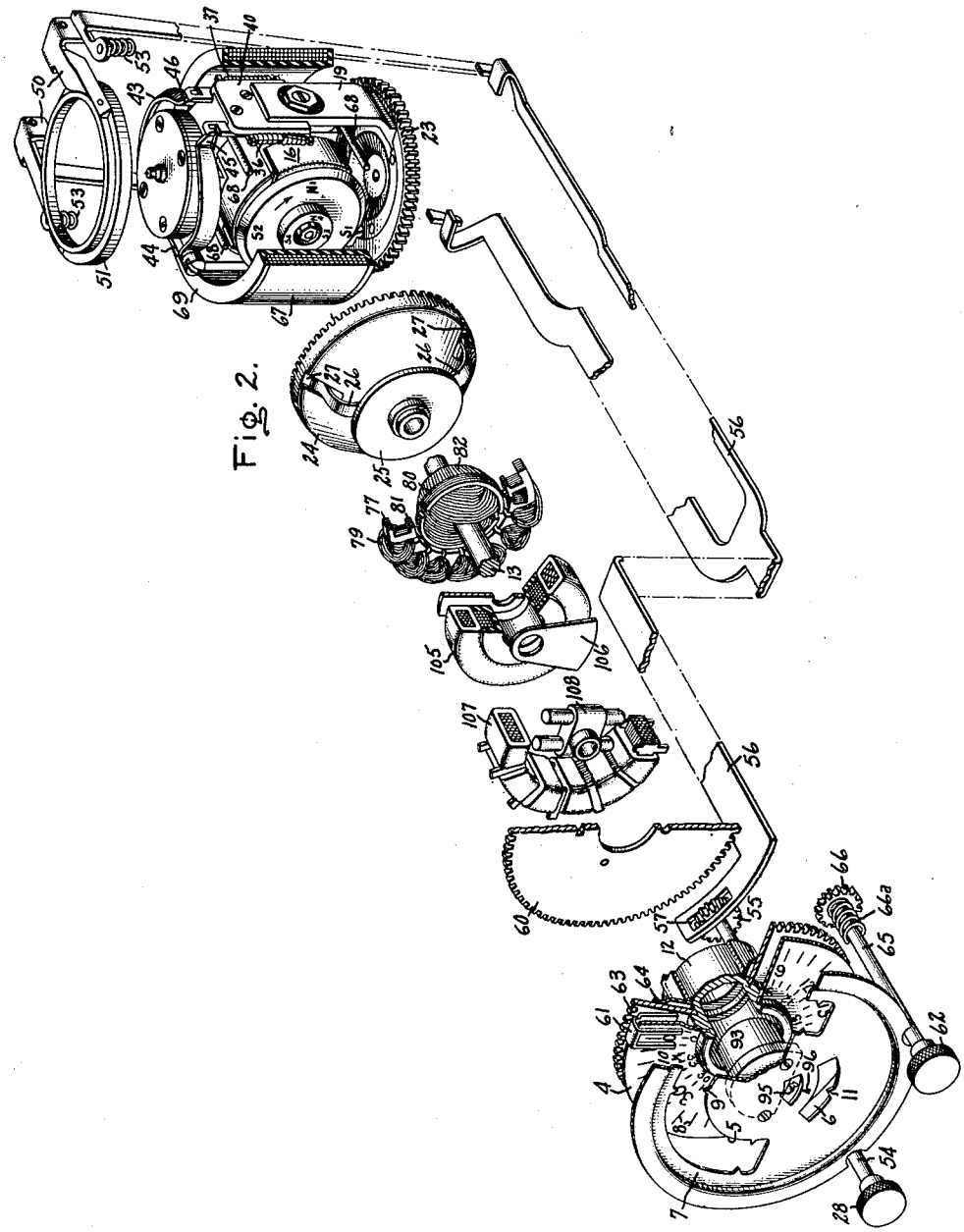
Figure 3:
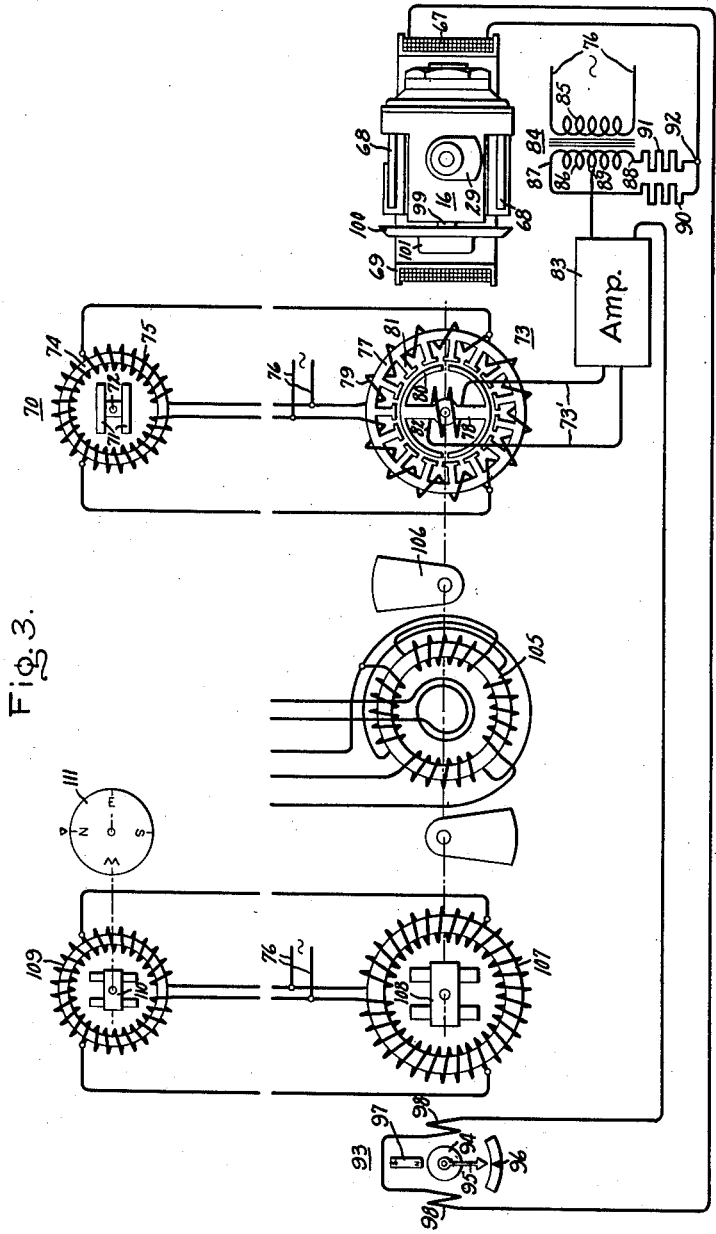

In the drawings, Fig. 1 is a side elevation view in section of a gyroscopic direction indicator embodying the features of the present invention; Fig. 2 is an exploded perspective, partly in section; and Fig. 3 is a schematic wiring diagram showing the electrical connections between the gyroscopic indicator and the compass control therefor.

Referring to the drawing, the direction indicating instrument is shown as comprising a frame 1 having attached at one end a face plate 2 which is adapted to be mounted on an instrument panel of an aircraft so that a circular opening 3 in the face plate faces the pilot, or other observer. The pilot observes through the opening 3 the movements of a compass dial 4, portions of which are visible through openings 5 and 6 in a masking plate 7. Azimuth indication is obtained by reading a scale 8 on the compass dial 4 against the fixed reference point 9 on the masking plate 7. Reverse heading indications are provided by means of an inner scale 10 (Fig. 2) on the compass dial 4 which is read against a stationary reference 11 on the masking plate 7. The compass dial 4 is rigidly mounted on a hollow hub member 12 which is in turn rigidly secured to one end of a shaft 13 extending lengthwise of the frame 1, the shaft 13 being supported at both ends by means of bearings 14 and 15 which are mounted on the frame.

In order to rotate the shaft 13 and the compass dial 4 in response to turning of the instrument, and thereby indicate direction or azimuth heading, there is provided a directional gyro indicated generally at 16. This directional gyro comprises, conventionally, a rotor which is rotatably mounted in a rotor bearing frame or housing, suitable drive motor means (not shown) being provided in the housing for driving the rotor. The gyro frame is rotatably mounted on a gimbal 19 by means of bearing pivots, so that the frame is free to rotate relative to the gimbal about a horizontal gimbal axis, the gimbal axis being at right angles to the spin axis of the gyro rotor. The gimbal 19 is mounted for rotation relative to the frame 1 about a vertical axis of the gyro by means of bearings 21 and 22. In order to transmit movements of the gyro gimbal 19 to the compass dial 4, there is provided a gear 23 which is connected to the lower portion of the gimbal and which engages a cup gear 24 mounted on the rear end of the shaft 13. In order to prevent back-lash and binding between the gears 23 and 24, the gear 24 is loosely mounted on a hub 25 connected to the end of shaft 13 so that the gear 24 is free to slide axially on the hub a limited amount. The cup gear 24 is urged into engagement with the gear 23 by means of springs 26 which are fastened to the hub 25 and bear against the surface of the gear, the outer ends of the springs 26 being received in slots 27 to prevent relative rotation between the gear and the hub.

It is desirable in the present instrument to provide means for rotating the directional gyro and its associated compass dial 4 after the gyro is caged to permit a manual setting of the directional gyro so that the reading of the compass dial 4 corresponds with the reading of the reference magnetic compass. This is accomplished by the provision of a gear 60 which is rigidly connected to the hub 12, the gear being positioned so that it is engaged by the gear 55 when the knob 28 and the shaft 54 are pushed inwardly to the caged position. After the gears 55 and 60 have been engaged or meshed by this movement a rotation of the knob 28 causes a rotation of the gear 60, which in turn rotates the directional gyro 16 and the compass dial 4.

In order to assist the pilot in maintaining a preset course, a course setter 61 is provided which may be rotated to any position on the scale 8 by means of a control knob 62. The course setter 61 is carried on a gear 63 which is slidably mounted on the hub 12, the gear 63 and the course setter 61 being frictionally restrained in any preset position by means of the spring 64. The course setting knob 62 is carried on a slidable shaft 65 on the inner end of which is mounted a gear 66 adapted to engage the gear 61 when the knob 62 and the shaft 65 are pulled outwardly to the operating position against the force of a biasing spring 66a.

As pointed out before, a directional gyro, while it gives a dead-beat reference and is unaffected by accelerations, is subject to the disadvantage that it tends to wander or drift slowly because of rotation of the earth, friction of the gimbal bearings, etc. This difficulty is overcome by the provision of a compass controlled torque motor which acts continuously to precess the gyro so that the spin axis thereof is maintained in predetermined relationship with the magnetic meridian as measured by the compass. The torque motor for precessing the spin axis of the directional gyro to the desired azimuth heading comprises a precessing coil 67 which coacts with a plurality of permanent magnets 68 mounted on the gyro rotor frame 18. The precessing coil 67 is wound on a flanged ring 69, the ring being clamped between two sections 1a and 1b of the frame 1, so that the ring surrounds the gyro and is coaxial with the vertical axis of the gyro. The ring is also preferably arranged so that a plane through the center thereof which is normal to the axis of the ring passes through the intersection of the three gyro axes for a reason which will subsequently become apparent. The permanent magnets 68 which are mounted on the frame 18 are arranged so that they produce magnetic fields extending at right angles to the axis of the ring 69. Therefore, when a direct current is passed through the precessing coil 67, there is an interaction between the magnetic fields produced by the coil 67 and the permanent magnet 68 such that a precessing torque is applied to the gyro about the horizontal gimbal axis. This causes the gyro to precess about the vertical axis in a direction dependent on the direction of the applied precessing torque which, in turn, depends upon the direction in which current flows through the precessing coil 67.

The torque motor is controlled by means of a magnetic compass 70 which is shown diagrammatically in Fig. 3 of the drawing. The compass 70 is shown as comprising a pair of compass magnetos 71 which are pivotally mounting at 72 in a horizontal position so that the compass magnets are free to swing into alignment with the horizontal component of the earth's field and thereby indicate the direction of the magnetic meridian. The position of the compass magnet 71 relative to the aircraft on which the compass is mounted is transmitted electrically to a detector unit 73 which compares the position of the compass with the position of the spin axis of the gyro and produces an alternating current signal voltage across the conductors 73' upon a departure of the spin axis of the gyro from a predetermined relationship with the compass magnets, the polarity of the alternating current signal being indicative of the direction of the error. A second harmonic type of electrical position-transmitting system is used to transmit the position of the compass 70 to the detecting unit 73. The compass transmitter unit is shown as comprising a stationary annular core 74 formed of permeable magnetic material such as "Permalloy," the core carrying a uniformly distributed exciting winding 75 which is connected to be energized from a suitable source of alternating current supply 76. The core 74 is arranged to be saturated periodically by the alternating current flowing in the exciting windings so that the magnetic flux flowing in the core from the compass magnets 71 is caused to pulsate whereupon second harmonic voltages are induced in the winding 75. The detector unit 73, which is essentially a polycircuit selsyn, comprises a stationary annular stator 77 which is mounted on the frame 1 of the instrument and a coaxially arranged rotor 78 which is mounted on and rigidly connected to the shaft 13. The stator core 77 of the detector unit is provided with a toroidal winding 79 which is connected to the alternating current supply lines 76. The winding 75 of the compass transmitter unit and the winding 79 of the detector unit are provided with corresponding taps or polycircuit connections which are symmetrically interconnected as shown, whereupon an alternating current flux is produced across the diameter of the core 77, the direction of the axis of this flux varying in accordance with the orientation of the compass magnets 71 relative to the compass transmitter. The rotor 78 of the detector unit is formed of magnetic material and forms a path for the second harmonic flux flowing across the stator core, and in order to assist in collecting the stator flux the rotor 78 is provided with arcuate pole pieces 80 as shown. To further assist in the passage of the second harmonic flux across the detector stator, the stator is provided, as shown, with salient pole pieces 81, which lie closely adjacent the rotor pole pieces 80 to provide a low reluctance magnetic path. The rotor 78 is provided with a single circuit rotor winding 82 which is connected as shown to the alternating current signal leads 74. Since the shaft 13 on which the rotor 78 of the detector 73 is mounted is positioned by the directional gyro, it can be seen that so long as the spin axis of the gyro maintains a predetermined relationship with the magnetic compass the alternating current across the signal leads 73' will remain zero, provided the axis of rotor 78 is initially set perpendicular to the stator flux axis, since any turning of the compass magnets relative to the aircraft in response to a turning of the aircraft will be accompanied by a corresponding rotation of the directional gyro relative to the instrument case. However, upon any departure of the spin axis of the gyro from the said predetermined relationship, an error signal in the form of an alternating current voltage will appear across the leads 73', the polarity of which indicates the direction of the deviation.

Since the alternating current error signal derived from the detector unit 73 is relatively weak, an amplifier 83 is provided for amplifying the error signal voltage, the amplifier 83 being illustrated schematically since it may be of any conventional construction. The output of the amplifier 83 is then rectified, and the rectified signal is then supplied to the precessing coil 67 of the torque motor to cause precession of the directional gyro. In order that the direction of the direct current flow in the precessing coil will be in accordance with the polarity of the alternating current error signal from the detector unit 73, a rectifier of the type which maintains a polarity correspondence between the input alternating current and the output direct current must be used. Heretofore, electronic discriminator rectifiers of the type using two normally balanced output tubes have been used for this purpose. Such balanced electronic devices, however, are subject to the disadvantage that the normally balanced output tubes must be perfectly matched with identical output characteristics or the rectified output currents will not be equal for opposite polarities of the alternating current input error signal. Since the compass magnets normally swing back and forth about a mean position, it is desirable that the precessing torque applied to the gyro have a corresponding mean value for minimum error. However, if the output of the rectifier is unsymmetrical, as is frequently the case with balanced electronic rectifiers, the gyro spin axis will assume a mean position which is not in correspondence with the mean position of the compass magnet whereupon an error in azimuth indication will result. To overcome this difficulty, a special type of rectifier is provided which inherently maintains symmetry of direct current output for alternating current input signals of either polarity. As shown, the rectifying means comprises a transformer 84 having a primary winding 85 and a secondary winding 86, the primary winding being connected to the same source of alternating current supply 76 that supplies the compass transmitter unit. The secondary winding 86 of the transformer 84 is provided with two end connections 87 and 88 and a center tap connection 89. The end connections 86 and 88 are connected to two non-linear resistors 90 and 91 having negative resistance-current characteristics, i. e., as the current flowing through them or the voltage applied across them increases, the resistance decreases, and vice versa. While various types of non-linear resistors or impedances may be used, it is preferred to use non-linear resistors formed of a material known to the trade as "Thyrite." For a more complete description of the characteristics of such material, reference may be had to United States Patent No. 1,822,742, granted September 8, 1931, on application of K. B. McEachron. The two remaining terminals of the non-linear resistors 90 and 91 are connected together at a common point 92, as shown. The rectifying means as described has the property that if a load circuit including an alternating current supply having twice the frequency of the alternating current supplied to the primary of transformer 84 and in correct phase relation thereto, is connected to the center tap 89 and the common connection 92, a rectifying action will take place, the direction of flow of the rectified current being in accordance with the polarity of the alternating current connected to the load circuit. The reason for the rectifying action is the fact that the non-linear resistors 90 and 91 act as "valves" in that their ohmic values are lowered twice per cycle of the fundamental A.-C. voltage derived from the supply line 76 in the region of the peak A.-C. values. This permits second harmonic currents to flow which have one polarity, the currents of the opposite polarity being blocked or greatly retarded twice per cycle of the fundamental when the alternating current of the supply voltage is low or at zero value and the ohmic values of resistors 90 and 91 are high. This rectifying scheme has the advantage that no normally balanced devices are used so that symmetry between the A.-C. input and the rectified D.-C. output is maintained, and also at the same time correspondence is maintained between polarity of the A.-C. input and the D.-C. output.

The use of two non-linear resistors connected as shown has the advantage that the fundamental A.-C. is cancelled out so that it does not appear in the rectified output and in addition twice the current capacity of each resistor is obtained.

As shown, the precessing coil of the torque motor 67 and the output of the alternating current signal amplifier 83 are connected in series circuit relationship with the rectifier connections 89 and 92. Due to the fact that the compass transmitter system previously described inherently produces a second harmonic signal voltage, the desired rectifying action takes place and the directional gyro is caused to precess about its vertical axis in a direction dependent upon the polarity of the alternating current error signal derived from the detector unit 73. Therefore, so long as the directional gyro and the compass are in correspondence, the error signal is zero and no current flows to the precessing coil of the torque motor. However, if the directional gyro tends to wander in one direction or another from the azimuth heading indicated by the compass, the torque motor acts to precess the directional gyro in a direction to return to the correct azimuth heading.

In order to provide means for indicating correspondence, or lack of correspondence, between the directional gyro and the magnetic compass, there is provided a correspondence indicator 93 which may be conveniently mounted on the masking plate 7, as shown, space being provided for the body of the instrument within the hollow hub member 12. The correspondence indicator 93 is a zero center type of direct current ammeter which may be connected as shown in Fig. 3 in series circuit relation with the precessing coil 67 of the gyro torque motor. The indicator 93 may also be connected in parallel with coil 67 if desired. Any suitable direct current ammeter may be used, such as, for example, the one shown in United States Patent No. 2,102,409, granted December 14, 1937, on application of H. T. Faus. Such an instrument is illustrated schematically in Fig. 3 as comprising a rotatably mounted permanent magnet 94 to which is connected a movable pointer 95, the pointer being normally kept opposite a stationary reference index 96 by means of a stationary centering or pull-off permanent magnet 97. Stationary current coils 98 are arranged to produce a magnetic flux tending to rotate the rotor magnet 94 so that the pointer 95 moves in a direction relative to the index 96 dependent upon the direction of current supplied to the current coils 98. It will now be clear that whenever the gyro and the compass are in correspondence the error signal will be zero, the direct current in the precessing coil 67 and the correspondence indicator 93 will also be zero, and the pointer 95 will be opposite the reference index 96 indicating the correspondence condition. On the other hand, if the gyro moves out of correspondence with the compass, the error signal from the detector unit 93 will not be zero and the resulting direct current flow in the precessing coil 67 and the correspondence indicator will cause the pointer 95 to move off the center mark in one direction or another, depending upon the direction of the correspondence error. Due to the fact that the correspondence indicator 93 is centrally located relative to the compass dial 4, it is convenient for the pilot or other observer to check the correspondence of the gyro with the compass whenever a determination of the azimuth heading is being made by an observation of the compass dial.

It is believed that the operation of the direction indicator will now be clear in view of the foregoing description. When it is desired to use the device, the compass control system and the directional gyro motor are electrically energized, and after the gyro rotor has come up to speed so as to acquire its property of rigidity, the compass dial 4 is actuated by relative movement between the gyro and the instrument case whereby a dead-beat azimuth indicator is provided. Before using the instrument, a check is made to see whether or not the gyro is in correspondence with the magnetic compass so that the compass dial 4 will indicate the correct heading. If the gyro is not in correspondence with the compass so that the compass dial 4 is reading incorrectly, this fact will be indicated by the correspondence indicator in that the pointer 95 will be deflected one direction or other from the zero reference 96. If sufficient time is allowed, the gyro torque motor will eventually precess the directional gyro into correspondence with the compass in response to the error signal from the detector unit 73. This operation may, however, take a considerable period of time, particularly if the gyro is initially greatly out of correspondence with the compass. In the present instrument it is unnecessary to wait for this rather slow initial correcting action to take place as the gyro may be initially set into correspondence with the compass manually. To accomplish this, the caging knob 28 is pushed inwardly to effect a caging of the gyro and to simultaneously engage the gears 55 and 60. The gyro and the compass card 4 are then rotated by rotating the knob 28 until the gyro moves into correspondence with the compass, as indicated by the pointer 95 of the correspondence indicator which will then move opposite the zero reference mark 96. The caging knob 28 is then pulled outwardly and the instrument is ready for use. If at any time during operation the directional gyro tends to drift out of correspondence with the compass, the torque motor precesses the gyro back into correspondence as has been explained above. If for some reason the directional gyro should move out of correspondence with the compass, due to improper operation of the torque motor or for some other reason, the operator will be informed of this fact by movement of the pointer 95 of the correspondence indicator away from the zero reference position. Thus in this case the gyro may be set into correspondence with the compass manually as explained above.

If desired, the direction indicating instrument of the present invention may also be used as the rudder control for an automatic pilot. For this purpose a pick-off unit or signal generator is indicated at 105, the pick-off unit being the conventional inductive type having a Z-shaped flux distributing rotor element 106 mounted to be rotated by the shaft 13, as will be well understood by those skilled in the art.

If it is desired to indicate azimuth position at a location remote from the direction indicator, a conventional electric position-transmitting system may be provided for actuating a remote indicator. For this purpose, a standard position-transmitter unit 107 of the second harmonic type is provided having a permanent magnet rotor 108 which is also mounted on the shaft 13 to be rotated thereby. As shown in Fig. 3, the transmitter unit 106 is electrically connected to the similar receiver unit 109 having a permanent magnet rotor 110 which is mechanically coupled to operate a remote indicator 111.

Thus it will be seen that there is provided a direction indicator which is easy to operate, reliable and compact to the point where it can be mounted on the instrument panel of an aircraft where space is at a premium.

While we have shown and described particular embodiments of our invention, it will occur to those skilled in the art that various changes and modifications may be made without departing from our invention, and we therefore aim in the appended claims to cover all such changes and modifications as fall within the true spirit and scope of our invention.

What we claim as new and desire to secure by Letters Patent of the United States is:

1. A navigational instrument comprising a directional gyro mounted for three degrees of freedom, a magnetic compass, detector means actuated jointly by said directional gyro and said compass for producing an alternating current error signal the polarity of which varies in accordance with the direction of departure of said directional gyro from a predetermined relationship with said compass, a direct current responsive torque motor for precessing said directional gyro, and means comprising a rectifier interconnecting said detector means and said torque motor, said rectifier comprising at least one non-linear impedance and means for periodically varying the ohmic value of said impedance whereby polarity-sensitive, symmetrical rectified current is obtained for actuating said torque motor in accordance with the polarity of said error signal.

2. A navigational instrument comprising a directional gyro mounted for three degrees of freedom, a magnetic compass comprising a rotatable magnet element free to swing about a mean position representing the magnetic meridian, and means for precessing said directional gyro so that the azimuth heading of the spin axis thereof is corrected to maintain a predetermined relationship with said mean compass position, said precessing means comprising a direct current responsive torque motor for applying a precessing torque to said directional gyro, a detector controlled jointly by said directional gyro and said magnet element of said compass for producing an alternating current error signal, the polarity of which varies in accordance with the direction of departure of said gyro spin axis from said predetermined relationship, and rectifier means interconnecting said detector and said torque motor, said rectifier means comprising a non-linear impedance and means for periodically varying the ohmic value of said impedance whereby a polarity-sensitive rectified current is obtained for actuating said torque motor, said current being symmetrical with reference to error signals of opposite polarities so that said directional gyro is corrected in accordance with the mean position of said compass magnet.

3. A navigational instrument comprising a directional gyro mounted with three degrees of freedom, a vertical compass dial, drive shaft means comprising a hollow hub member on which said dial is mounted, said directional gyro being coupled with said shaft for angular orientation thereof in accordance with the azimuth heading of said gyro, a zero-center direct current ammeter recessed in said hollow hub member and mounted to present output indications for simultaneous observation with the indications of said dial, a magnetic compass, a detector actuated jointly by said directional gyro and said compass for producing an alternating current error signal the polarity of which varies in accordance with the direction of departure of said directional gyro from a predetermined relationship with said compass, and means comprising a rectifier interconnecting said detector means and said zero-center direct current ammeter, said rectifier comprising at least one non-linear impedance and means for periodically varying the ohmic value of said impedance whereby polarity-sensitive symmetrical rectified current is obtained for actuating said ammeter in accordance with the polarity of said error signal.

4. A navigational instrument comprising a directional gyroscope, a magnetic compass, electrical detector means actuated jointly by said gyroscope and compass for producing alternating current error signals the polarity and magnitude characteristics of which represent the direction and extent of the departure of the spin axis of said gyroscope from a predetermined relationship with said magnetic compass, a direct current zero-center ammeter, rectifier means intercoupling said detector means and ammeter, said rectifier means comprising at least one non-linear impedance and means for periodically varying the ohmic value of said impedance whereby polarity-sensitive rectified current is obtained for actuating said ammeter in accordance with the characteristics of said error signals.

ANNA C. SINKS,
*Administratrix of the Estate of Allen T. Sinks, Deceased.*

RICHARD A. PFUNTNER.
SAMUEL GABRIELSON.

REFERENCES CITED

The following references are of record in the file of this patent:

UNITED STATES PATENTS

| Number | Name | Date |
|---|---|---|
| 1,982,702 | Sperry | Dec. 4, 1934 |
| 2,307,788 | Nisbet et al. | Jan. 12, 1943 |
| 2,383,461 | Esval et al. | Aug. 28, 1945 |
| 2,414,448 | Carter | Jan. 21, 1947 |

FOREIGN PATENTS

| Number | Country | Date |
|---|---|---|
| 482,389 | Great Britain | Mar. 29, 1938 |
| 553,730 | Great Britain | June 3, 1943 |